US012287804B2

(12) United States Patent
Fozdar et al.

(10) Patent No.: US 12,287,804 B2
(45) Date of Patent: Apr. 29, 2025

(54) NATURAL LANGUAGE-BASED DATA INTEGRATION

(71) Applicant: Microsoft Technology Licensing, LLC, Redmond, WA (US)

(72) Inventors: Shaily Jignesh Fozdar, Boston, MA (US); David Joseph Donahue, Cambridge, MA (US); Fang Liu, Shanghai (CN); Noelle Yanhui Li, New York, NY (US); Abhishek Narain, Woodinville, WA (US); Irene Rogan Shaffer, Cambridge, MA (US); Wee Hyong Tok, Redmond, WA (US); Ehimwenma Nosakhare, Newton, MA (US); Vivek Gupta, Groton, MA (US); Gust Verbruggen, Keerbergen (BE); Vu Minh Le, Redmond, WA (US); Jordan Joseph Henkel, Madison, WI (US); Avrilia Floratou, Sunnyvale, CA (US); Joyce Yu Cahoon, Woodinville, WA (US); Richard Anarfi, Boston, MA (US); Jason Wang, Boston, MA (US); Daniel Muñoz Huerta, Cambridge, MA (US); Yan Qiu, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/241,028

(22) Filed: Aug. 31, 2023

(65) Prior Publication Data

US 2025/0077538 A1 Mar. 6, 2025

(51) Int. Cl.
*G06F 17/00* (2019.01)
*G06F 16/242* (2019.01)
*G06F 16/25* (2019.01)

(52) U.S. Cl.
CPC .......... *G06F 16/254* (2019.01); *G06F 16/243* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 6,484,161 B1 * 11/2002 Chipalkatti ............ G06Q 30/02
6,493,721 B1 * 12/2002 Getchius ................ G06Q 30/02
(Continued)

OTHER PUBLICATIONS

Wei, Jason, "137 emergent abilities of large language models", Retrieved from: https://www.jasonwei.net/blog/emergence, Nov. 14, 2022, 3 Pages.

(Continued)

*Primary Examiner* — Hung D Le
(74) *Attorney, Agent, or Firm* — Ray Quinney & Nebeker; James Bullough

(57) ABSTRACT

A computer-implemented method for performing natural language-based data integration includes causing execution of a data integration application on a remote device via a network and causing surfacing of a GUI corresponding to the data integration application on a display of the remote device. The method includes receiving, via the GUI, a natural language input representing a data integration task, generating, via an LLM, a set of ordered activities corresponding to the data integration task represented by the natural language input, and selecting, via the LLM, one or more APIs for performing each activity within the set of ordered activities. The method also includes generating a data pipeline based on the set of ordered activities and the API(s) for performing each activity, as well as back-translating the data pipeline to a desired data format for execution by the data integration application.

20 Claims, 7 Drawing Sheets

(56) References Cited

U.S. PATENT DOCUMENTS

| | | | | |
|---|---|---|---|---|
| 6,496,843 | B1* | 12/2002 | Getchius | G06F 16/957 |
| | | | | 707/999.002 |
| 6,826,559 | B1* | 11/2004 | Ponte | G06F 16/9538 |
| | | | | 707/999.005 |
| 8,849,693 | B1* | 9/2014 | Koyfman | G06Q 30/02 |
| | | | | 705/14.1 |
| 11,100,079 | B2* | 8/2021 | Mark | G06F 16/212 |
| 11,567,965 | B2* | 1/2023 | Liao | G06F 16/2456 |
| 11,625,415 | B2* | 4/2023 | Cappiello | G06F 16/24542 |
| | | | | 707/718 |
| 2002/0029207 | A1* | 3/2002 | Bakalash | G06F 16/283 |
| 2008/0294996 | A1* | 11/2008 | Hunt | G06Q 30/02 |
| | | | | 707/999.102 |
| 2018/0075158 | A1* | 3/2018 | Li | G06F 16/9024 |
| 2019/0378428 | A1* | 12/2019 | Nevarez | G06F 40/131 |
| 2021/0349887 | A1* | 11/2021 | Alonzo | G06F 16/284 |
| 2022/0035823 | A1* | 2/2022 | Morton | G06F 16/243 |
| 2022/0043826 | A1 | 2/2022 | Zorin et al. | |
| 2022/0121674 | A1* | 4/2022 | Hasan | G06F 16/254 |
| 2022/0198394 | A1* | 6/2022 | Chandra | H04L 63/0807 |
| 2023/0066110 | A1 | 3/2023 | Bodziony et al. | |
| 2023/0089365 | A1* | 3/2023 | Manzano | G06F 16/258 |
| | | | | 707/602 |
| 2023/0237053 | A1 | 7/2023 | Dangoor | |
| 2023/0353575 | A1* | 11/2023 | Chandra | H04L 63/08 |

OTHER PUBLICATIONS

International Search Report and Written Opinion received for PCT Application No. PCT/US2024/038271, Nov. 7, 2024, 12 pages.

"Data Integration Market Size, Share [2022-2028] | Global Industry Future Growth, Demand, Market Dynamics,Trends, Drivers, Challenges, Restraints, Key Players, Recent Developments and Revenue Analysis Research | Industry Research Biz", Retrieved from: https://www.globenewswire.com/news-release/2022/10/12/2532858/0/en/Data-Integration-Market-Size Share-2022-2028-Global-Industry-Future-Growth-Demand-Market-Dynamics-Trends-Drivers-Challenges-, Restraints-Key-Players-Recent-Developments-and-Revenue-A.html#:~: text=global%20Data%20Integration%20is%20estimated%20to,with%20a%20CAGR%20of%207.5%25%20during%20review%20period, Oct. 12, 2022, 9 pages.

"Informatica Expands Its Intelligent Data Management Cloud with Innovations Led by Claire GPT, Industry's First Generative AI-Powered Data Management Platform", Retrieved from: https://www.informatica.com/gb/about-us/news/news-releases/2023/05/20230509-informatica expands-its-intelligent-data-management-cloud-with-innovations-led-by-claire-gpt-industrys-first-generative-ai-powered-data-management-platform.html, May 9, 2023, 3 Pages.

"Matillion and IDG Survey: Data Growth is Real, and 3 Other Key Findings", Retrieved from: https://www.matillion.com/resources/blog/matillion-and-idg-survey-data-growth-is-real-and-3-other-key-findings, Jan. 26, 2022, 4 Pages.

"SnapLogic Reveals SnapGPT to Revolutionize Integration and Automation", Retrieved from: https://www.snaplogic.com/company/newsroom/press-releases/snaplogic-reveals-snapgpt-to-revolutionize-integration-and-automation, Mar. 23, 2023, 4 Pages.

Halevy, et al., "Learnings from Data Integration for Augmented Language Models", In Repository of arXiv:2304.04576v1, Apr. 10, 2023, 7 Pages.

Lee, et al., "Hallucinations in Neural Machine Translation", In Proceedings of the International Conference on Learning Representations, May 6, 2019, 18 Pages.

Liang, et al., "TaskMatrix.AI: Completing Tasks by Connecting Foundation Models with Millions of APIs", In Repository of arXiv:2303.16434v1, Mar. 29, 2023, 27 Pages.

Schick, et al., "Toolformer: Language models can teach themselves to use tools", In Repository of arXiv:2302.04761v1, Feb. 9, 2023, 17 Pages.

Shen, et al., "HuggingGPT: Solving AI Tasks with ChatGPT and its Friends in Hugging Face", In Repository of arXiv:2303.17580v3, May 25, 2023, 25 Pages.

Ulagaratchagan, Arun, "Introducing Microsoft Fabric: Data analytics for the era of AI", Retrieved from: https://azure.microsoft.com/en-us/blog/introducing-microsoft-fabric-data-analytics-for-the-era-of-ai/, May 23, 2023, 15 Pages.

* cited by examiner

NATURAL LANGUAGE-BASED DATA INTEGRATION

BACKGROUND

The present disclosure generally relates to data integration. More specifically, the present disclosure relates to performing data integration based on natural language queries.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for performing natural language-based data integration is provided. The method is implemented via a service provider device including a processor. The method includes causing execution of a data integration application on a remote device via a network, causing surfacing of a graphical user interface (GUI) corresponding to the data integration application on a display of the remote device, and receiving, via the GUI, a natural language input representing a data integration task. The method also includes generating, via a large language model (LLM), a set of ordered activities corresponding to the data integration task represented by the natural language input and selecting, via the LLM, one or more application programming interfaces (APIs) for performing each activity within the set of ordered activities. The method further includes generating a data pipeline based on the set of ordered activities and the API(s) for performing each activity, as well as back-translating the data pipeline to a desired data format for execution by the data integration application.

In another embodiment described herein, a service provider device is provided. The service provider device includes a processor, a communication connection for connecting a remote device to the service provider device via a network, a data integration application, and a computer-readable storage medium operatively coupled to the processor. The computer-readable storage medium includes computer-executable instructions that, when executed by the processor, cause the processor to cause execution of the data integration application on the remote device via the network, cause surfacing of a GUI corresponding to the data integration application on a display of the remote device, and receive, via the GUI, a natural language input representing a data integration task. The computer-readable storage medium includes computer-executable instructions that, when executed by the processor, cause the processor to generate, via an LLM, a set of ordered activities corresponding to the data integration task represented by the natural language input, to select, via the LLM, one or more APIs for performing each activity within the set of ordered activities, and to execute the API(s) for performing each activity to generate a context for each activity. The computer-readable storage medium also includes computer-executable instructions that, when executed by the processor, cause the processor to generate a data pipeline based on the set of ordered activities, the API(s) for performing each activity, and the corresponding context for each activity. The computer-readable storage medium further includes computer-executable instructions that, when executed by the processor, cause the processor to back-translate the data pipeline to a desired data format for execution by the data integration application and to cause surfacing of a representation of the data pipeline via the GUI.

In another embodiment described herein, a computer-readable storage medium is provided. The computer-readable storage medium includes computer-executable instructions that, when executed by a processor, cause the processor to execute a data integration application, to surface a GUI corresponding to the data integration application, and to receive, via the GUI, a natural language input representing a data integration task. The computer-readable storage medium also includes computer-executable instructions that, when executed by the processor, cause the processor to generate, via an LLM, a set of ordered activities corresponding to the data integration task represented by the natural language input and to select, via the LLM, one or more APIs for performing each activity within the set of ordered activities. The computer-readable storage medium further includes computer-executable instructions that, when executed by the processor, cause the processor to generate a data pipeline based on the set of ordered activities and the API(s) for performing each activity and to back-translate the data pipeline to a desired data format for execution by the data integration application.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
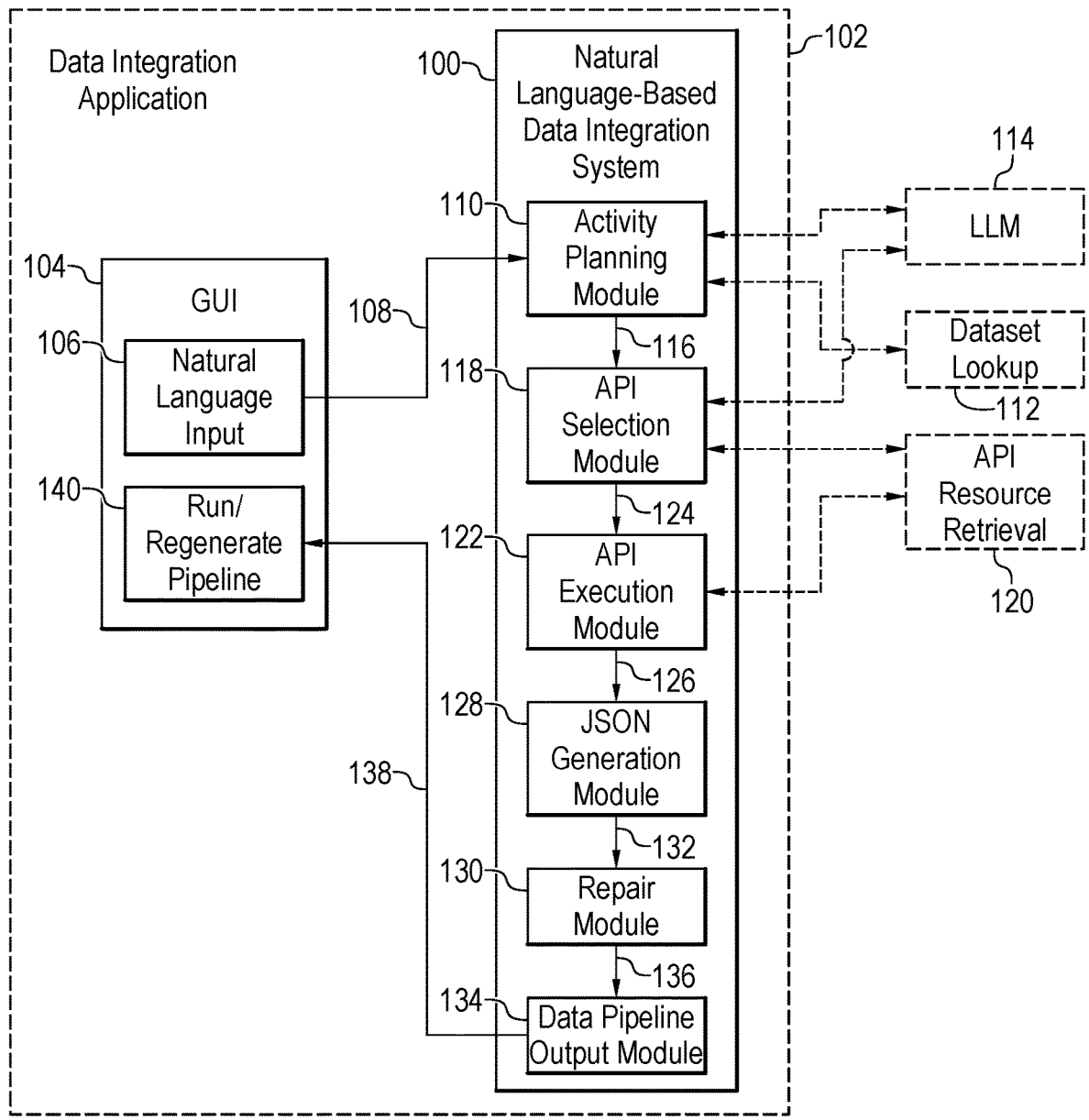
FIG. 1 is a simplified schematic view of an exemplary natural language-based data integration system according to embodiments described herein.

Data integration applications enable users to create data integration processes that are capable of ingesting, consolidating, transforming, and transferring data from one or more originating sources to one or more destinations, while generating mappings and performing data cleaning in the process. However, the creation of such data integration processes is a challenging task that requires significant domain expertise.

Existing data integration applications (such as, for example, Azure® Data Factory provided by Microsoft Corporation) aim to simplify the data integration process by providing platforms that enable users to visually integrate data sources from various built-in connectors (where the term "connectors" is used herein to refer to both the originating source(s) and the destination(s) for the respective data). Despite this, however, the creation of data pipelines still proves to be a challenge for many users who are unfamiliar with the space, such as business users and new data engineers. Moreover, given that the number of new users in the data integration space continues to rapidly grow and that the market opportunity for data integration has been estimated to grow exponentially, it is highly desirable to improve the usability of data integration applications.

The overall goal of a data integration system is to provide seamless access to a set of data sources, where the user can pose queries to the system through a mediated schema representing the various classes, objects, relationships, and attributes the system models. To answer a user query, the system reformulates the user query into an executable query, i.e., a query that refers to the source schemas and can actually be executed by the data integration system. However, according to current data integration solutions, the representation of the initial user query is limited to programmatic languages or a specific set of user interactions with an interface. As a result, current data integration solutions require a high level of domain knowledge to correctly create the initial user query.

The present techniques solve these and other issues by providing for the utilization of a large language model (LLM) to perform data integration based on natural language queries (i.e., user queries that are specified in the form of natural language, where the term "natural language" is intended to encompass human language or text that is provided to a device in any suitable form, such as in typographical form, audio form, visual form, or the like). By supporting natural language queries in this manner, the data integration solution described herein greatly assists users with creating complex data pipelines and, thus, lowers the barrier to successfully performing data integration. More specifically, the present techniques provide a natural language-based data integration system that leverages an LLM as a controller for invoking and coordinating the execution of various application programming interfaces (APIs) in order to generate valid data pipelines, including Extract, Transform, and Load (ETL) data pipelines and/or Extract, Load, and Transform (ELT) data pipelines. In this manner, the natural language-based data integration system serves as a robust tool for identifying functional dependencies among a set of data pipelines to aid with the translation of verbose pipelines into more compressed programs. Moreover, associated metrics are provided to ensure the LLM is appropriately decomposing natural language queries into the right sub-tasks, as well as correctly planning the task order and dependencies based on the given context. In addition, the present techniques provide a post-processing repair process that can handle any type of LLM hallucination that occurs during the generation of the data pipeline. Furthermore, the framework provided by the present techniques can be easily extended to the enterprise data integration context, where multiple activities can be successfully integrated to increase the ease with which enterprises (e.g., organizations, companies, and/or other entities) can perform data integration tasks.

Turning to a more detailed description of the present techniques, the natural language-based data integration system described herein utilizes an LLM to translate natural language queries regarding data integration into executable data integration processes. As used herein, the term "large language model (LLM)" is inclusive of multimodal models in addition to text-only models and, more broadly speaking, is intended to encompass any type of machine learning model that is capable of processing a natural language query to perform the activity planning and API selection tasks described herein. In various embodiments, the LLM described herein is based on the transformer architecture, which consists of self-attention mechanisms and feed-forward neural networks. The self-attention mechanism allows the LLM to capture relationships between different words or tokens in a sequence, where each word is associated with three learned vectors: query, key, and value. These vectors are derived from the input embeddings and capture different aspects of the word's representation. In various embodiments, the LLM described herein extends the self-attention mechanism by employing multi-head attention. Instead of a single set of query, key, and value vectors, the LLM utilizes multiple sets of these vectors, called attention heads. Each attention head independently learns different relationships and aspects of the input sequence. In multi-head attention, the query, key, and value vectors are projected into lower-dimensional subspaces. This projection allows the LLM to capture different relationships and to attend to different parts of the input sequence simultaneously. For each attention head, the similarity between the query vectors and the key vectors is computed using dot product or other similarity measures. The resulting similarity scores are scaled and passed through a SoftMax function to obtain attention weights. The attention weights are used to compute a weighted sum of the value vectors. This weighted sum represents the attended representation of the input sequence, highlighting the most relevant information based on the learned relationships and similarities. The output from all attention heads is then concatenated and projected back into the original embedding space. This allows the LLM to integrate information from multiple attention heads and to preserve the original dimensionality of the input sequence. By employing this mechanism, also known as multi-query attention, the LLM captures different perspectives and relationships within the input sequence simultaneously. This enables the LLM to learn more nuanced and contextually-rich representations, enhancing its language understanding and generation capabilities, even in the context of low-resource languages.

In various embodiments, the natural language-based data integration process described herein includes an activity planning phase, an API selection phase, an API execution phase, a JavaScript Object Notation (JSON) generation phase, and a repair phase, as described further herein. This approach has shown success for generating various ETL and ELT data pipelines that involve activities such as get-metadata, for-each, copy, lookup, and email notifications, for example, where the terms "ETL" and ELT" refer to two different three-phase data integration processes where data is either extracted, transformed, and then loaded into an output data source (i.e., ETL) or extracted, loaded into an output data source, and then transformed (i.e., ELT). Furthermore, this process may be applied to any number of other enterprise data integration scenarios, including the creation of pipelines that involve complex permutations of various activities, the support of additional activities such as data flows, and the ability to crawl various public endpoints to develop data stores.

According to embodiments described herein, the LLM is utilized, not only as a code generator, but also as a planner, scheduler, and coordinator. More specifically, in various embodiments, the activity planning phase of the data integration process is performed via the LLM, where the term "activity" refers to a preprocessing step in a data pipeline that can include data movement, data transformation, or a control step, and the term "pipeline" refers to a logical grouping of activities that performs a task and enables a codeless data transformation. More specifically, during the activity planning phase, the LLM is utilized to analyze the initial natural language query received from the user and to reformulate such query into an executable query that is represented by various data integration activities (with appropriate ordering) that are to be executed to fulfill the user request.

Moreover, to build complex and realistic data pipelines, the LLM is utilized to control, manage, and call various APIs that bring in the correct contextual information for generating each step of the data pipeline. In particular, in various embodiments, during the API selection phase of the data integration process, the LLM is utilized to call one or more activity-specific APIs for each activity identified during the activity planning phase, where such APIs are intended to provide the context for generating each corresponding activity JSON correctly. Furthermore, in various embodiments, during the API execution phase of the data integration process, each invoked API is then executed, and the results are returned.

Data integration applications typically represent data pipelines in JSON format. Therefore, in various embodiments, the present techniques take the user's (typically, underspecified) natural language query and then leverage the LLM, in combination with a back-translator, to generate the desired ETL/ELT data pipeline in JSON format. More specifically, in various embodiments, after the LLM generates the ordered set of activities for the data pipeline and identifies the appropriate API(s) for each activity, the JSON generation phase of the data integration process is executed. During this phase, a back-translator is utilized to generate a full JSON representation of the generated data pipeline. (Notably, however, in some embodiments, a different type of data format may be utilized instead of JSON, in which case this phase may be referred to as the data formatting phase of the data integration process.) Moreover, in various embodiments, the post-processing repair phase of the data integration process is then executed to make any suitable repairs to the generated data pipeline (e.g., by accounting for any errors that may have occurred due to LLM hallucinations during the process).

In some embodiments, one or more metrics are utilized to determine the accuracy of the data pipeline that is generated for a given natural language query. One exemplary metric is JSON validity, which measures whether the generated content can be parsed into a valid JSON file. Another exemplary metric is partial-match accuracy, which measures the percentage of key and value pairs in the generated JSON file that match a manually-generated (or ground-truth) JSON file (where such JSON file excludes certain JSON properties that do not impact the execution of the data pipeline). Another exemplary metric is executability, which measures whether the generated JSON file is executable by the data integration application. Another exemplary metric is exact-match accuracy, which measures the percentage of queries that have a 100% partial-match accuracy score. Notably, the natural language-based data integration process described herein has been shown to perform well according to all these exemplary metrics, thus demonstrating the effectiveness of the present techniques.

The present techniques provide various advantages over conventional data integration techniques as well as conventional LLM techniques. As an example, while conventional techniques require the initial user query to be provided in the form of a programmatic language or a specific set of user interactions with an interface, the present techniques utilize an LLM to effectively reformulate a simple natural language query into a fully-executable query. Moreover, the generated fully-executable query is not an existing programming language but, instead, a novel language that is specific to creating and modifying data pipelines. More specifically, in various embodiments, the language is a high-level, LLM-friendly language that is specialized for generating data pipeline activities and interacting with other entities within the data integration platform (i.e., via APIs). As another example, the present techniques utilize an LLM to identify the specific data sources that are relevant to the natural language query, which is a complex task due to the large, evolving nature of data source and destination schema types. In particular, data integration applications often support over one hundred different connector types, and enterprises may utilize hundreds of different data sources. The complexity of this task is also increased due to the potential variability and vague nature of the provided user input. Therefore, by utilizing an LLM to perform this process, the present techniques provide a significant advantage over conventional data integration techniques. As another example, the present techniques utilize an LLM to conduct the appropriate reformulations for translating the natural language query into a set of ordered, dependent activities. Data pipelines are unbounded in their complexity and can vary from performing a singular copy operation to a set of data transformations and movements with control flow operations. Supporting these various activities, determining dependencies from a natural language query, and combining the results is a challenging process. As another example, the present techniques utilize an LLM to provide the appropriate domain knowledge for reformulating and executing the natural language query. As another example, the present techniques provide a post-processing repair process for mitigating mistakes that are made during the process, including outputs that are nonsensical or incorrect. This may include, for example, any LLM hallucinations that occurred during the process.

In general, the most common use-case for data integration applications includes copying data between a specific source and a chosen destination. For this use-case, the JSON representation of the copy process may reference a source dataset and a destination (or sink) dataset between which the relevant data are copied, where the term "dataset" in this context refers to a representation of the data referenced in a particular activity, and the two datasets may consist of various connection types. However, as the complexity of the data pipeline increases, the length of the corresponding JSON representation also increases, taking up an increasingly larger token budget out of the total allocated token budget for each LLM call. Accordingly, the present techniques advantageously utilize the LLM to first divide the natural language query into a number of ordered activities and then to analyze each activity separately. This effectively avoids exceeding the allocated token budget for each LLM call and further reduces the number of LLM hallucinations that occur during the process. As a result, the present techniques provide for the efficient generation of data pipelines in response to natural language queries.

Turning now to a detailed description of the drawings, FIG. 1 is a simplified schematic view of an exemplary natural language-based data integration system 100 according to embodiments described herein. As shown in FIG. 1, in various embodiments, the natural language-based data integration system 100 is implemented within the context of a data integration application (or tool) 102. The data integration application 102 provides a GUI 104 surfaced on a display of a corresponding device to enable the user to provide a natural language input 106 in the form of a query regarding the performance of a desired data integration task. This natural language input 106 is then provided as the initial input to the natural language-based data integration system 100, as indicated by arrow 108.

More specifically, the natural language input 106 is provided to an activity planning module 110 of the natural language-based data integration system 100. In various embodiments, the activity planning module 110 then determines one or more datasets corresponding to the natural language input 106 and performs a dataset lookup operation, as indicated by box 112. The activity planning module 110 also calls the LLM described herein, as indicated by box 114, and utilizes the LLM to parse the natural language input 106 into multiple tasks, where each task corresponds to a distinct activity within a corresponding pipeline. The activity planning module 110 further utilizes the LLM to determine the activity execution order and activity dependencies. In various embodiments, this is accomplished by utilizing specification-based instructions and demonstration-based examples in the corresponding prompt, where the specification-based instructions may consist of a uniform template that allows the LLM to perform task parsing via slot filling. As a non-limiting example, there may be at least four slots for task parsing: task type, task identification, task dependencies, and task arguments. In this example, the task type covers all the activities that can be generated (e.g., get-metadata, for-each, copy, lookup, email notifications, and the like). The task identification is a unique identifier for task planning, where the order of the tasks is used as a reference to ensure that activities are generated in the correct order. Task dependencies define the pre-requisite tasks for execution (e.g., for a copy operation, data cannot be copied unless the source and destination datasets are specified). The task arguments are either pre-populated from the natural language input 106 or are generated from the context that is brought in from the relevant APIs. In addition, in various embodiments, relevant demonstrations are included in the prompt to guide the LLM towards generating the correct activity plans.

The output of the activity planning module 100 includes an ordered set of data integration activities that represent a fully-executable version of the natural language input 106 provided by the user. As indicated by arrow 116, this output is provided to an API selection module 118. The API selection module 118 calls the LLM described herein, as indicated by box 114, and utilizes the LLM to determine one or more activity-specific APIs to be utilized for each activity identified by the activity planning module 110. In particular, in various embodiments, the LLM analyzes various APIs that are exposed by the data integration application to determine which API(s) should be accessed and then executed to bring in the correct contextual information (e.g., one or more specific connection strings) for performing each activity. In various embodiments, such APIs are selected from a pre-generated list of APIs. In various embodiments, this includes retrieving resources about such APIs, as indicated by box 120, where such resources include information about the API classification. More specifically, in various embodiments, the APIs are classified such that only certain APIs are invoked for each type of activity. As an example, the copy data repair API may only be available for a data copying activity. This API classification ensures that suitable APIs are utilized to bring in the context for each activity and also ensures that the correct sequence of actions is taken to accurately generate the full ETL/ELT pipeline, for example. Moreover, in various embodiments, functional dependencies between APIs are delineated. As an example, if data are to be extracted from an SQL source, a limited set of APIs can be called to list the files from the SQL source. Furthermore, in some embodiments, the list of APIs includes all the APIs that are supported by the data integration application 102, as well as any number of additional APIs that may be introduced to the data integration application 102.

The output of the API selection module 118 includes a list of one or more APIs that are to be called for each activity provided by the activity planning module 110. This output is then provided to an API execution module 122, as indicated by arrow 124, at which each invoked API is executed, and the results are returned. In some embodiments, the APIs for different activities are invoked in parallel, enabling the APIs for multiple activities to be called simultaneously and, thus, increasing the efficiency of the process. As indicated by arrow 126, the results of the API execution module 122 are then provided to a JSON generation module 128, along with the outputs from the activity planning module 110 and the API selection module 118.

The JSON generation module 128 combines all the information from the activity planning module 110, the API selection module 118, and the API execution module 122 and generates a summary of the desired data pipeline. A back-translator is then utilized to generate a full JSON representation of the data pipeline. More specifically, the back-translator acts as an interpretation module that receives the intermediary language in which each activity is expressed and then converts such intermediary language to the full JSON representation (or other suitable data format).

In various embodiments, the JSON representation is then provided to a repair module 130, as indicated by arrow 132. In such embodiments, the repair module 130 performs a post-processing repair process to make any suitable repairs to the generated data pipeline, including by accounting for any LLM hallucinations that may have affected the generation of the data pipeline. For example, in some embodiments, this includes fixing values that were incorrectly (or partially incorrectly) generated by the LLM. As a specific example within the context of Microsoft® Azure®, the LLM might provide a value under the key "type" under dataset settings as "SqlDWTable" when, in fact, the correct value is "AzureSqlDWTable." Since the constraints for various fields in the JSON are known, repairs may be applied to ensure that these fields adhere to such constraints. Moreover, in some embodiments, any new keys generated by the LLM in the JSON are eliminated since the key-value pairs for every activity type are already known.

The JSON representation of the data pipeline is then provided to a data pipeline output module 134, as indicated by arrow 136. The data pipeline output module 134 generates the final data pipeline and provides a representation of the data pipeline on the GUI 104 that is surfaced on the user's display, as indicated by arrow 138 and box 140. In various embodiments, the user then provides input indicating a desire to run or regenerate the data pipeline (among other potential tasks), and the data integration application 102 responds by performing the task requested by the user. In some embodiments, if the user is not satisfied with the generated data pipeline, the user may provide an additional natural language input 106, and the natural language-based data integration system 100 may modify the data pipeline accordingly.

FIG. 1 is not intended to indicate that the natural language-based data integration system 100 is to include the specific configuration and/or composition shown. Rather, the configuration and/or composition of the natural language-based data integration system 100 may vary depending on the details of the particular implementation, and FIG. 1 is only intended as an example of a particular implementation of the natural language-based data integration system 100. For example, the JSON generation module 128 may be generalized to a data formatting module for embodiments in which data formats other than JSON are utilized.

As described herein, the present techniques can be used to efficiently generate data pipelines involving activities such as get-metadata, for-each, copy, lookup, and email notifications. In addition, the present techniques can be extended to support other data integration scenarios, including the creation of complex pipelines that synthesize other activities, such as the utilization of Azure® Notebooks or the scraping of web endpoints to develop data stores. Moreover, in addition to creating data pipelines, the modeling and evaluation framework provided by the present techniques can be generalized for other products and/or services. For example, the present techniques may be extended to products and/or services offering LLM-driven assistants. This may be particularly beneficial in the debugging domain, in which product teams seek to create tools that reduce the amount of time it takes to debug a service. In particular, many actions are taken when dealing with mitigating software bugs, including crawling many job logs, querying various telemetry, and evaluating customer feedback. Since many permutations of such actions exist, and each action requires its own context, the framework provided by the present techniques can be leveraged to handle similar scenarios through the generation of an LLM-driven autonomous agent.

Figure 2:
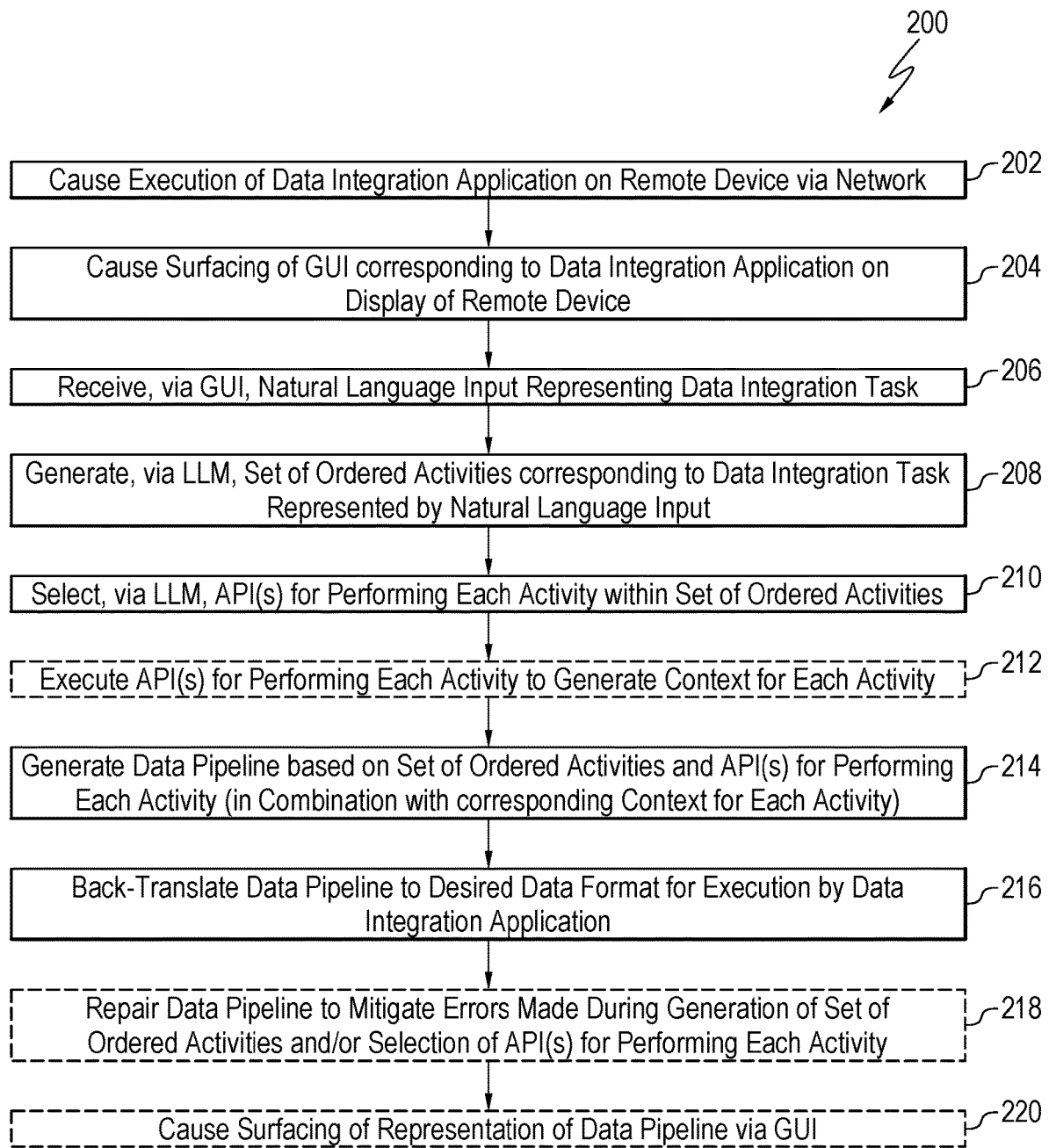
FIG. 2 is a process flow diagram of an exemplary method for performing data integration based on natural language queries according to embodiments described herein.

FIG. 2 is a process flow diagram of an exemplary method 200 for performing data integration based on natural language queries according to embodiments described herein. The method 200 is executed via one or more devices, such as the exemplary device described with respect to FIG. 4. In particular, in various embodiments, the device(s) implementing the method 200 include one or more devices that are operated by a service provider that provides a data integration service to remote devices, such as remote enterprise devices operated by users associated with particular enterprises. In such embodiments, the service provider device(s) include one or more processors and one or more computer-readable storage media including computer-executable instructions that, when executed by the processor(s), cause the processor(s) to perform the blocks of the method 200. An exemplary embodiment of such computer-readable storage media is described with respect to FIG. 6. Moreover, in various embodiments, the method 200 is executed within the context of a network environment including the service provider device(s) as well as the remote device(s), as described further with respect to the exemplary network environment of FIG. 5.

The method 200 begins at block 202, at which a data integration application is executed (or caused to be executed on a remote device via a network). At block 204, a GUI corresponding to the data integration application is surfaced on a display (or caused to be surfaced on a display of the remote device). At block 206, a natural language input (or query) representing a data integration task is received via the GUI.

At block 208, a set of ordered activities corresponding to the data integration task represented by the natural language input is generated via an LLM. In various embodiments, this includes parsing, via the LLM, the natural language input into multiple activities corresponding to the data integration task represented by the natural language input, determining, via the LLM, the execution order for the activities, and determining, via the LLM, dependencies among the activities. Moreover, in some such embodiments, the natural language input is parsed into multiple activities via the LLM based on a specification-based instruction including a uniform template for performing task parsing via slot filling, where the slots include a task type, a task identification, a task dependency, and/or a task argument, for example.

At block 210, one or more APIs for performing each activity within the set of ordered activities are selected via the LLM. At block 212, the API(s) for performing each activity may be executed to generate the context for each activity. In some embodiments, at least a portion of the APIs for performing the activities are executed in parallel.

At block 214, a data pipeline is generated based on the set of ordered activities and the API(s) for performing each activity (in combination with the corresponding context for each activity). In various embodiments, the data pipeline is an ETL data pipeline or an ELT data pipeline. However, other suitable types of data pipelines may be generated, depending on the details of the particular implementation.

At block 216, the data pipeline is back-translated to a desired data format for execution by the data integration application. In various embodiments, the desired data format is JSON format. However, other suitable data formats may be utilized, depending on the details of the particular implementation.

At block 218, the data pipeline may be repaired to mitigate errors made during the generation of the set of ordered activities and/or the selection of the API(s) for performing each activity. In various embodiments, this includes mitigating one or more hallucinations made by the LLM during the execution of the method 200.

At block 220, a representation of the data pipeline may be surfaced (or caused to be surfaced) via the GUI. Furthermore, in some embodiments, a user input indicating a desire to run or regenerate the data pipeline is received via the GUI, and the data pipeline is run or regenerated in accordance with such user input.

The block diagram of FIG. 2 is not intended to indicate that the blocks of the method 200 are to be executed in any particular order, or that all of the blocks of the method 200 are to be included in every case. Moreover, any number of additional blocks may be included within the method 200, depending on the details of the specific implementation.

Figure 3A:
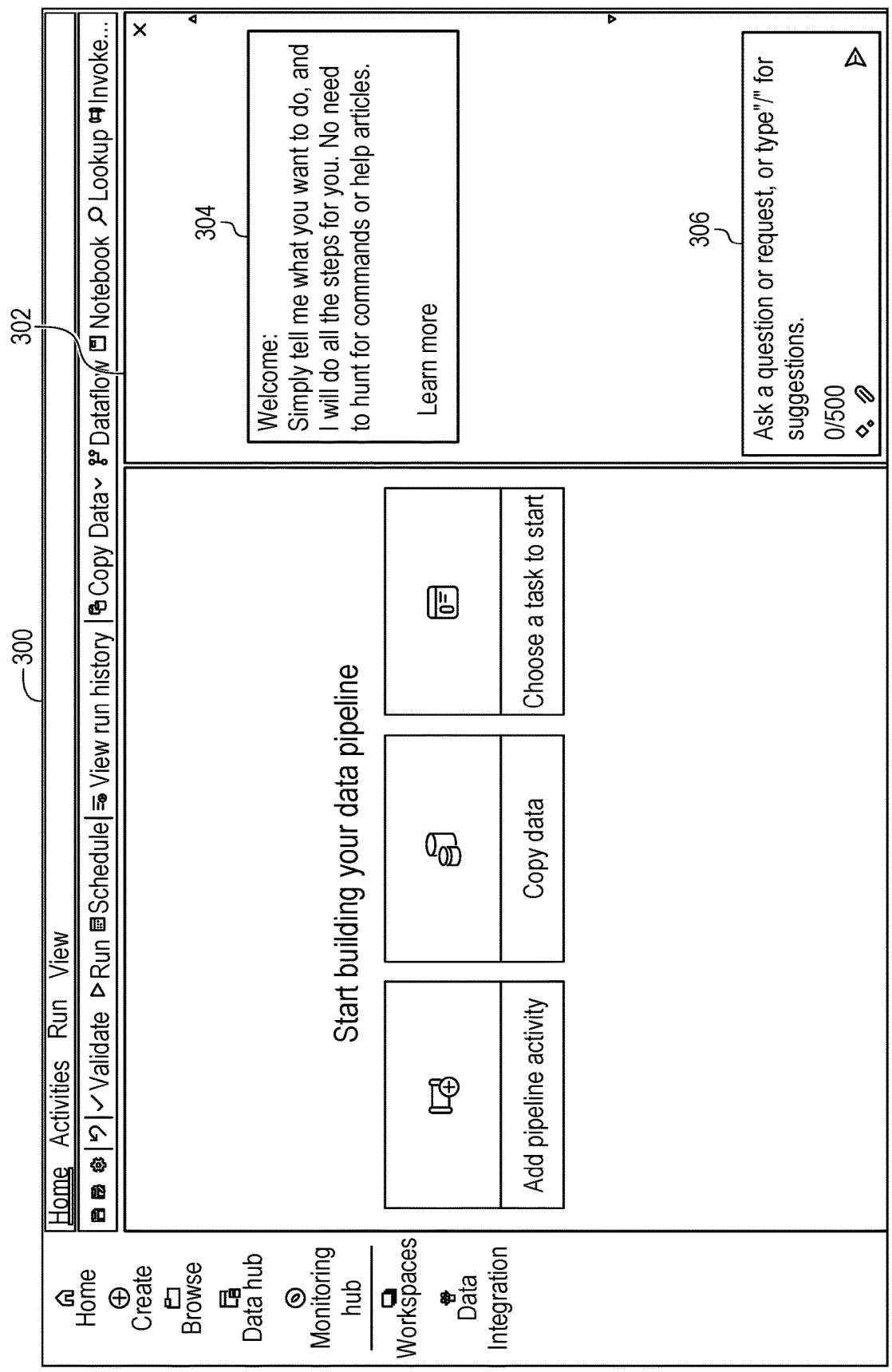
FIGS. 3A and 3B are simplified schematic views of an exemplary graphical user interface (GUI) of a data integration application that provides for the execution of a natural language-based data integration process (or at least a portion thereof) from the perspective of the user according to embodiments described herein.
Figure 3B:
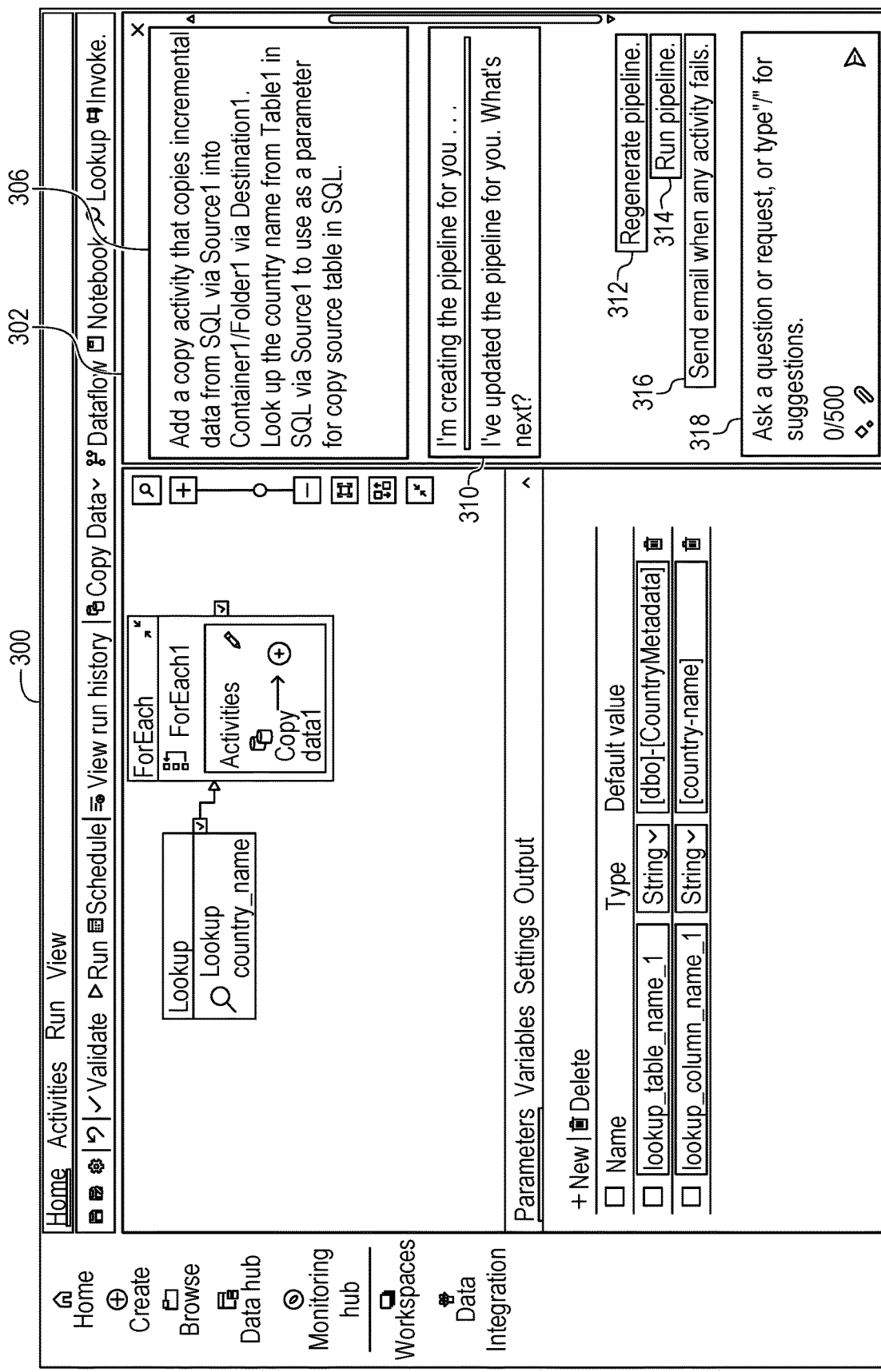

FIGS. 3A and 3B are simplified schematic views of an exemplary GUI 300 of a data integration application that provides for the execution of a natural language-based data integration process (or at least a portion thereof) from the perspective of the user according to embodiments described herein. As shown in FIG. 3A, the exemplary GUI 300 includes various UI elements that are designed to assist the user with performing a data integration task by building a data pipeline. In accordance with some embodiments of the present techniques, a window 302 is provided along the righthand side of the GUI 300, where such window 302 is designed to enable the user to provide input for performing the natural language-based data integration process described herein. Specifically, the exemplary window 302 shown in FIG. 3A provides a chat bot-style implementation of the present techniques. In this particular embodiment, the window 302 includes a chat bot introduction 304 stating, "Welcome: Simply tell me what you want to do, and I will do all the steps for you. No need to hunt for commands or help articles." The window 302 also includes a text field 306 that allows the user to respond by providing input in the form of a natural language query corresponding to a desired data integration task.

Turning now to FIG. 3B, the user has input the following natural language query into the text field 306: "Add a copy activity that copies incremental data from SQL via Source1 into Container1/Folder1 via Destination1. Look up the country name from Table1 in SQL via Source1 to use as a parameter for copy source table in SQL." In response to this natural language query, the natural language-based data integration system described herein has generated and output a corresponding data pipeline, as shown in window 308. In addition, as shown in box 310, the chat bot has responded by stating, "I'm creating the pipeline for you. . . . I've updated the pipeline for you. What's next?" As shown in the window 302, a number of buttons are then surfaced, including a "Regenerate Pipeline" button 312, a "Run Pipeline" button 314, and a "Send Email When Any Activity Fails" button 316, as well as a second text field 318 that enables the user to direct the modification of the generated data pipeline, if desired.

Notably, the exemplary implementation described with respect to FIGS. 3A and 3B is provided for illustrative purposes only. In practice, the techniques described herein and, in particular, the GUI provided by the data integration application described herein, may be implemented in any other suitable manner, depending on the details of the particular implementation.

Figure 4:
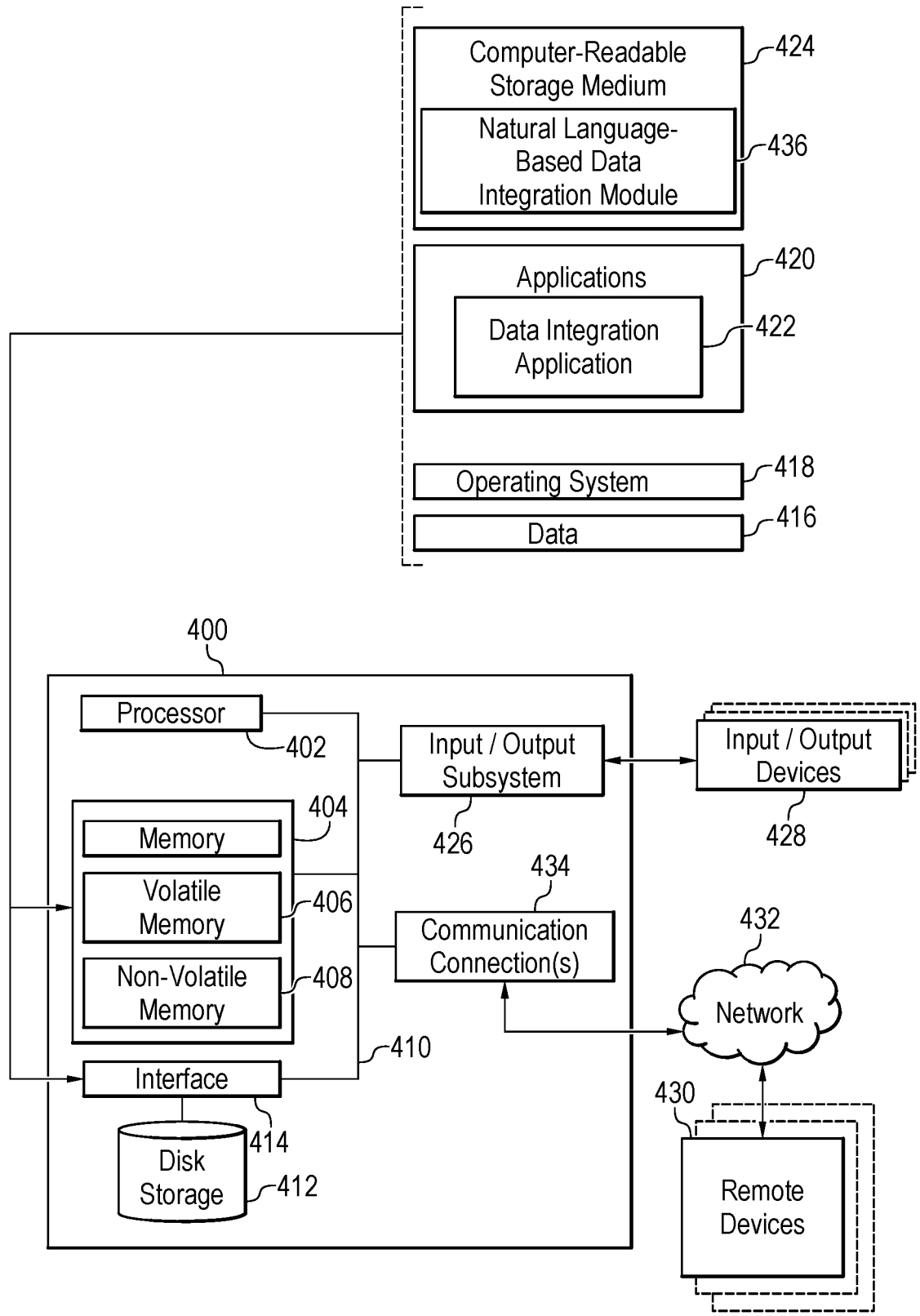
FIG. 4 is a block diagram of an exemplary device for implementing the techniques described herein.

FIG. 4 is a block diagram of an exemplary device 400 for implementing the techniques described herein. The exemplary device 400 includes a processor 402 and a memory 404. The processor 402 may include any suitable type of processing unit or device, such as, for example, a single-core processor, a multi-core processor, a computing cluster, or any number of other configurations. Moreover, the processor 402 may include, for example, an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 404 typically (but not always) includes both volatile memory 406 and non-volatile memory 408. The volatile memory 406 retains or stores information so long as the memory is supplied with power. By contrast, the non-volatile memory 408 is capable of storing (or persisting) information even when a power supply is not available. The volatile memory 406 may include, for example, RAM (e.g., synchronous RAM (SRAM), dynamic RAM (DRAM), synchronous dynamic RAM (SDRAM), and the like) and CPU cache memory. The nonvolatile memory 408 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 402 and the memory 404, as well as other components of the device 400, are interconnected by way of a system bus 410. The system bus 410 can be implemented using any suitable bus architecture.

As shown in FIG. 4, the device 400 also includes a disk storage 412. The disk storage 412 may include any suitable removable/non-removable, volatile/non-volatile storage component or device. For example, the disk storage 412 may include, but is not limited to, a magnetic disk drive, floppy disk drive, tape drive, Jaz drive, Zip drive, LS-210 drive, flash memory card, memory stick, or the like. In addition, the disk storage 412 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 412 to the system bus 410, a removable or non-removable interface is typically used, such as interface 414 shown in FIG. 4.

In various embodiments, the disk storage 412 and/or the memory 404 function as one or more databases that are used to store data 416 relating to the techniques described herein. Such data 416 may include, but are not limited to, various datasets that are suitable to undergo (or have already undergone) the natural language-based data integration process described herein.

FIG. 4 describes software that acts as an intermediary between a user of the device 400 and the basic computing resources described with respect to the operating environment of the device 400. Such software includes an operating system 418. The operating system 418, which may be stored on the disk storage 412, acts to control and allocate the computing resources of the device 400. Moreover, system application(s) 420, including the data integration application 422 described herein, take advantage of the management of the computing resources by the operating system 418 through one or more program modules stored within a computer-readable storage medium (or media) 424, as described further herein.

The device 400 also includes an input/output (I/O) subsystem 426. The I/O subsystem 426 includes a set of hardware, software, and/or firmware components that enable or facilitate inter-communication between the user of the device 400 and the processor 402 of the device 400. During operation of the device 400, the I/O subsystem 426 enables the user to interact with the device 400 through one or more I/O devices 428. Such I/O devices 428 may include any number of input devices or channels, such as, for example, one or more touchscreen/haptic input devices, one or more buttons, one or more pointing devices, one or more accessories, one or more audio input devices, and/or one or more video input devices, such as a camera. Furthermore, in some embodiments, the one or more input devices or channels connect to the processor 402 through the system bus 410 via one or more interface ports (not shown) integrated within the I/O subsystem 426. Such interface ports may include, for example, a serial port, a parallel port, a game port, and/or a universal serial bus (USB).

In addition, such I/O devices 428 may include any number of output devices or channels, such as, for example, one or more audio output devices, one or more haptic feedback devices, and/or one or more display devices. Such output devices or channels may use some of the same types of ports as the input devices or channels. Thus, for example, a USB port may be used to both provide input to the device 400 and to output information from the device 400 to a corresponding output device. Moreover, in some embodiments, the one or more output devices or channels are accessible via one or more adapters (not shown) integrated within the I/O subsystem 426.

In various embodiments, the device 400 is communicably coupled to any number of remote devices 430. The remote device(s) 430 may include, for example, one or more personal computers (e.g., desktop computers, laptop computers, or the like), one or more tablets, one or more mobile devices (e.g., mobile phones), one or more network PCs, and/or one or more workstations. As an example, in some embodiments, the device 400 is a service provider device hosting the data integration application 422 in a networked environment using logical connections to the remote devices 430, which may be operated by users associated with enterprises that utilize the data integration application 422.

In various embodiments, the remote devices 430 are logically connected to the device 400 through a network 432 and then connected via a communication connection 434, which may be wireless. The network 432 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 434 includes the hardware/software employed to connect the network 432 to the bus 410. While the communication connection 434 is shown for illustrative clarity as residing inside the device 400, it can also be external to the device 400. The hardware/software for connection to the network 432 may include, for example, internal and external technologies, such as mobile phone switches, modems including regular telephone grade modems, cable modems and DSL modems, ISDN adapters, and/or Ethernet cards.

As described above, the system applications 420 (and, in particular, the data integration application 422) take advantage of the management of the computing resources by the operating system 418 through one or more program modules stored within the computer-readable storage medium (or media) 424. In some embodiments, the computer-readable storage medium 424 is integral to the device 400, in which case it may form part of the memory 404 and/or the disk storage 412. In other embodiments, the computer-readable storage medium 424 is an external device that is connected to the device 400 when in use.

In various embodiments, the one or more program modules stored within the computer-readable storage medium 424 include program instructions or code that may be executed by the processor 402 to perform various operations. In various embodiments, such program module(s) include, but are not limited to, a natural language-based data integration module 436 that causes the processor 402 to perform the techniques described herein.

The block diagram of FIG. 4 is not intended to indicate that the device 400 is to include all of the components shown in FIG. 4. Rather, the device 400 can include fewer or additional components not illustrated in FIG. 4 (e.g., additional applications, additional modules, additional memory devices, additional network interfaces, etc.). Furthermore, any of the functionalities of the one or more program modules may be partially, or entirely, implemented in hardware and/or in the processor 402. For example, the functionality may be implemented with an application specific integrated circuit, in logic implemented in the processor 402, or in any other device.

Figure 5:
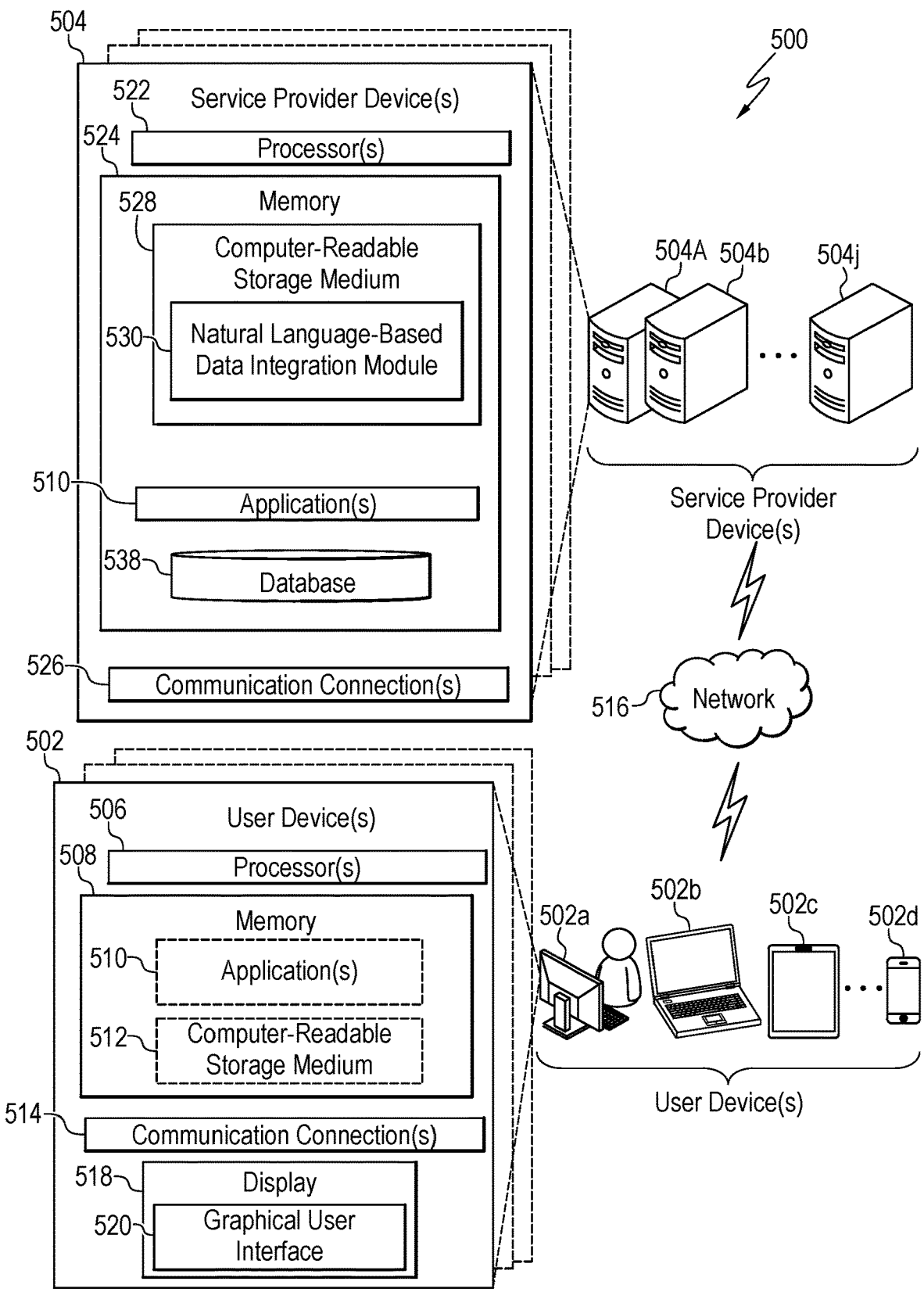
FIG. 5 is a block diagram of an exemplary network environment for implementing the techniques described herein.

FIG. 5 is a block diagram of an exemplary network environment 500 for implementing the techniques described herein. As shown in FIG. 5, the network environment 500 includes one or more user devices 502 and one or more service provider devices 504. Each user device 502 includes one or more processors 506 and memory 508 communicably coupled to the processor(s) 506. Each user device 502 may be implemented as any type of device, including (but not limited to) a personal computer, a laptop computer, a tablet computer, a portable digital assistant (PDA), a mobile phone (e.g., a smart phone), an electronic book (e-book) reader, a game console, a set-top box (STB), a smart television (TV), a portable game player, a portable media player, and so forth. FIG. 5 shows representative user devices in the forms of a desktop computer 502A, a laptop computer 502B, a tablet 502C, and a mobile device 502D. However, these are merely examples, and the user device(s) 502 described herein may take many other forms.

Each user device 502 may include one or more applications 510 (and/or data corresponding to the execution of such application(s) 510) and one or more computer-readable storage media 512 stored in the memory 508. Each user device 502 also includes a communication connection 514 by which the user device 502 is able to communicate with other devices, including the service provider device(s) 504, over a network 516. Furthermore, each user device 502 includes a display 518, which may be a built-in display or an external display, depending on the particular type of device. According to embodiments described herein, the display 518 is configured to surface one or more graphical user interfaces (GUIs) 520 corresponding to the execution of the application(s) 510 on the user device 502, including the data integration application described herein.

In various embodiments, at least a portion of the application(s) 510 (including the data integration application described herein) are implemented or hosted by the service provider device(s) 504, which may be provided as one or more server farms and/or data centers, for example. As an example, in the embodiment shown in FIG. 5, the service provider device(s) 504 include servers 504A-J. Moreover, it should be noted that the server components shown in FIG. 5 may each be implemented within any or all of the multiple service provider devices 504, depending on the details of the particular implementation. Specifically, the service provider device(s) 504 include one or more processors 522 communicably coupled to memory 524. The memory 524 may include one or more multiple memory devices, depending on the details of the particular implementation. The service provider device(s) 504 also include one or more communication connections 526 by which at least a portion of the application(s) 510 (including the data integration application described herein) may be executed or hosted on the user device(s) 502 via the network 516. In particular, the service provider device(s) 504 provide for the execution of the application(s) 510 on the user device(s) 502 by, for example, surfacing the one or more GUIs 520 associated with the application(s) 510 on the display 518 corresponding to each user device 502.

In various embodiments, the memory 524 includes the application(s) 510 (including the data integration application described herein), as well as one or more computer-readable storage media 528. The computer-readable storage medium (or media) 528 includes program instructions or code that may be executed by the processor(s) 522 (and/or the processor(s) 506) to perform various operations. In various embodiments, such program instructions or code include, but are not limited to, a natural language-based data integration module 530 that causes the processor(s) 522 to perform operations in accordance with the techniques described herein. The memory 524 further includes a database 532, which may be configured to store (among other data) various datasets that are suitable to undergo (or have already undergone) the natural language-based data integration process described herein.

The simplified block diagram of FIG. 5 is not intended to indicate that the network environment 500 is to include all of the components shown in FIG. 5. Rather, the network environment 500 may include different components and/or additional components not illustrated in FIG. 5. For example, in practice, the user device(s) 502 and the service provider device(s) 504 will typically include a number of additional components not depicted in the simplified block diagram of FIG. 5, as described with respect to the device 400 of FIG. 4, for example.

Figure 6:
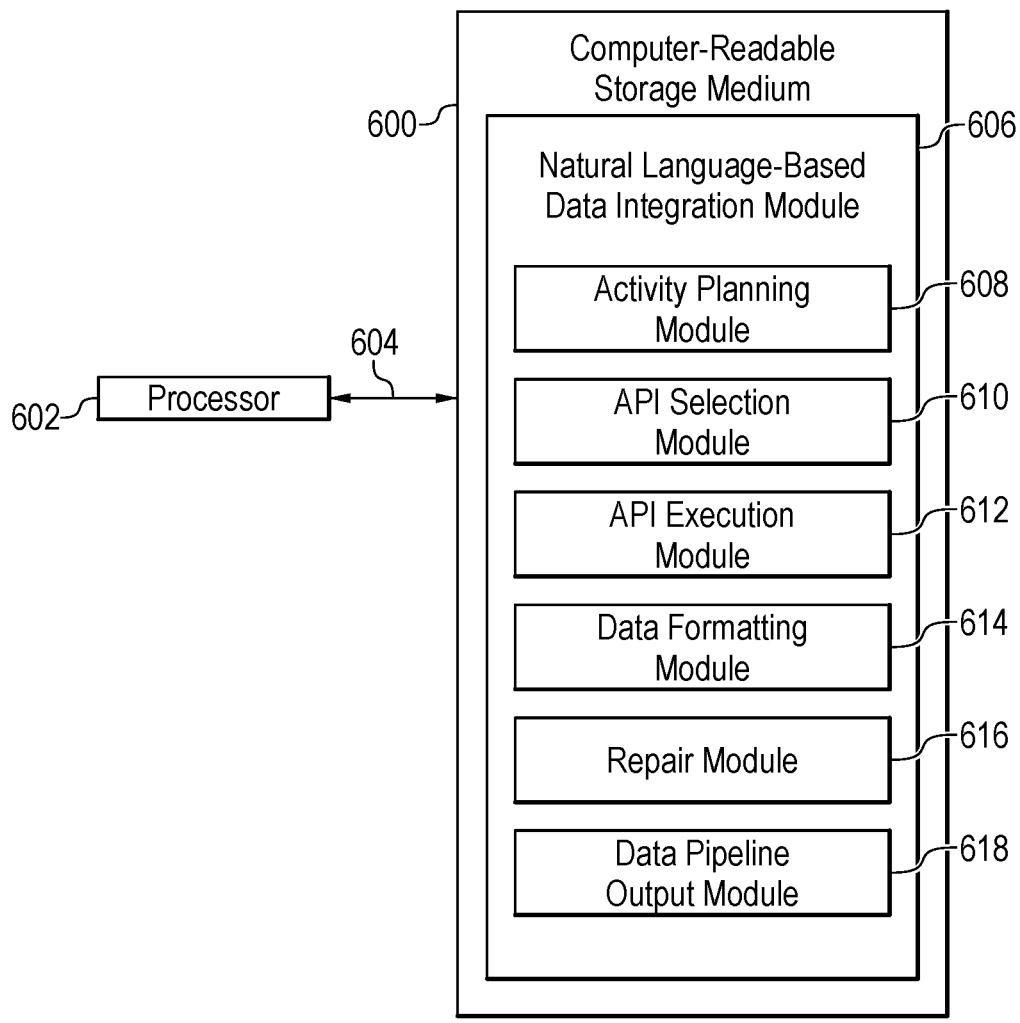
FIG. 6 is a block diagram of an exemplary computer-readable storage medium for implementing the techniques described herein.

FIG. 6 is a block diagram of an exemplary computer-readable storage medium (or media) 600 for implementing the techniques described herein. In various embodiments, the computer-readable storage medium 600 is accessed by one or more processor(s) 602 over one or more computer interconnects 604. For example, in some embodiments, the computer-readable storage medium 600 is the same as (or similar to) the computer-readable storage medium described with respect to the device 400 of FIG. 4 and/or the network environment 500 of FIG. 5.

In various embodiments, the computer-readable storage medium 600 includes code to direct the processor(s) 602 to perform the operations of the present techniques. Such code may be stored within the computer-readable storage medium 600 in the form of program modules, where each module includes a set of computer-executable instructions that, when executed by the processor(s) 602, cause the processor(s) 602 to perform a corresponding set of operations. In particular, as described herein, the computer-readable storage medium 600 includes (but is not limited to) a natural language-based data integration module 606 that directs the processor(s) 602 to perform at least a portion of the techniques described herein. In various embodiments, the natural language-based data integration module 606 further includes a number of modules/sub-modules that direct the processor(s) 602 to perform various phases of the data integration process described herein. Such modules may include, but are not limited to, an activity planning module 608, an API selection module 610, an API execution module 612, a data formatting module 614, a repair module 616, and a data pipeline output module 618.

In practice, the computer-readable storage medium (or media) 600 may vary from the exemplary implementation shown in FIG. 6. In particular, any suitable number of the modules shown in FIG. 6 may be omitted from the computer-readable storage medium (or media) 600. Furthermore, any number of additional modules/sub-modules not shown in FIG. 6 may be included within the computer-readable storage medium (or media) 600, depending on the details of the specific implementation.

It should be noted that some components shown in the figures are described herein in the context of one or more structural components, referred to as functionalities, modules, features, elements, etc. However, the components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include devices, discrete logic components, such as application specific integrated circuits (ASICs), and the like, as well as any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium (or media)" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a device, the execution thereof causes, configures and/or adapts the executing device to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a device for execution via various transmission means and mediums, including carrier waves and/or propagated signals. However, for purposes of this disclosure, the term "computer-readable storage medium (or media)" refers specifically to non-transitory forms of computer-readable storage media and expressly excludes carrier waves and/or propagated signals.

The present techniques may be susceptible to various modifications and alternative forms, including (but not limited to) those described in the following examples:

Example 1 is a method for performing natural language-based data integration. The method is implemented via a service provider device including a processor. The method includes: causing execution of a data integration application on a remote device via a network; causing surfacing of a GUI corresponding to the data integration application on a display of the remote device; receiving, via the GUI, a natural language input representing a data integration task; generating, via an LLM, a set of ordered activities corresponding to the data integration task represented by the natural language input; selecting, via the LLM, at least one API for performing each activity within the set of ordered activities; generating a data pipeline based on the set of ordered activities and the at least one API for performing each activity; and back-translating the data pipeline to a desired data format for execution by the data integration application.

Example 2 includes the method of example 1, including or excluding optional features. In this example, the method includes executing the at least one API for performing each activity to generate a context for each activity; and generating the data pipeline based on the set of ordered activities and the at least one API for performing each activity, in combination with the corresponding context for each activity.

Example 3 includes the method of example 2, including or excluding optional features. In this example, the method includes executing at least a portion of the APIs for performing the activities in parallel.

Example 4 includes the method of any one of examples 1 to 3, including or excluding optional features. In this example, the method includes repairing the data pipeline to mitigate errors made during at least one of the generation of the set of ordered activities or the selection of the at least one API for performing each activity.

Example 5 includes the method of example 4, including or excluding optional features. In this example, repairing the data pipeline includes mitigating at least one hallucination by the LLM.

Example 6 includes the method of any one of examples 1 to 5, including or excluding optional features. In this example, the method includes causing surfacing of a representation of the data pipeline via the GUI.

Example 7 includes the method of example 6, including or excluding optional features. In this example, the method includes: receiving, via the GUI, a user input indicating a desire to run or regenerate the data pipeline; and running or regenerating the data pipeline in accordance with the user input.

Example 8 includes the method of any one of examples 1 to 7, including or excluding optional features. In this example, the method includes generating the set of ordered activities via the LLM by: parsing, via the LLM, the natural language input into multiple activities corresponding to the data integration task represented by the natural language input; determining, via the LLM, an execution order for the activities; and determining, via the LLM, dependencies among the activities.

Example 9 includes the method of example 8, including or excluding optional features. In this example, the method includes parsing the natural language input into multiple activities via the LLM based on a specification-based instruction including a uniform template for performing task parsing via slot filling, where the slots include at least one of a task type, a task identification, a task dependency, or a task argument.

Example 10 includes the method of any one of examples 1 to 9, including or excluding optional features. In this example, the desired data format includes a JSON data format.

Example 11 includes the method of any one of examples 1 to 10, including or excluding optional features. In this example, the data pipeline includes an ETL data pipeline or an ELT data pipeline.

Example 12 is a service provider device. The service provider device includes a processor, a communication connection for connecting a remote device to the service provider device via a network, a data integration application, and a computer-readable storage medium operatively coupled to the processor. The computer-readable storage medium includes computer-executable instructions that, when executed by the processor, cause the processor to: cause execution of the data integration application on the remote device via the network; cause surfacing of a GUI corresponding to the data integration application on a display of the remote device; receive, via the GUI, a natural language input representing a data integration task; generate, via an LLM, a set of ordered activities corresponding to the data integration task represented by the natural language input; select, via the LLM, at least one API for performing each activity within the set of ordered activities; execute the at least one API for performing each activity to generate a context for each activity; generate a data pipeline based on the set of ordered activities, the at least one API for performing each activity, and the corresponding context for each activity; back-translate the data pipeline to a desired data format for execution by the data integration application; and cause surfacing of a representation of the data pipeline via the GUI.

Example 13 includes the service provider device of example 12, including or excluding optional features. In this example, the computer-readable storage medium includes computer-executable instructions that, when executed by the processor, cause the processor to repair the data pipeline to mitigate errors made during at least one of the generation of the set of ordered activities or the selection of the API for performing each activity.

Example 14 includes the service provider device of example 12 or 13, including or excluding optional features. In this example, the computer-readable storage medium includes computer-executable instructions that, when executed by the processor, cause the processor to: receive, via the GUI, a user input indicating a desire to run or regenerate the data pipeline; and run or regenerate the data pipeline in accordance with the user input.

Example 15 includes the service provider device of any one of examples 12 to 14, including or excluding optional features. In this example, the computer-readable storage medium includes computer-executable instructions that, when executed by the processor, cause the processor to generate the set of ordered activities via the LLM by: parsing, via the LLM, the natural language input into multiple activities corresponding to the data integration task represented by the natural language input; determining, via the LLM, an execution order for the activities; and determining, via the LLM, dependencies among the activities.

Example 16 includes the service provider device of example 15, including or excluding optional features. In this example, the computer-readable storage medium includes computer-executable instructions that, when executed by the processor, cause the processor to parse the natural language input into multiple activities via the LLM based on a specification-based instruction including a uniform template for performing task parsing via slot filling, where the slots include at least one of a task type, a task identification, a task dependency, or a task argument.

Example 17 includes the service provider device of any one of examples 12 to 16, including or excluding optional features. In this example, the desired data format includes a JSON data format.

Example 18 is a computer-readable storage medium including computer-executable instructions that, when executed by a processor, cause the processor to: execute a data integration application; surface a GUI corresponding to the data integration application; receive, via the GUI, a natural language input representing a data integration task; generate, via an LLM, a set of ordered activities corresponding to the data integration task represented by the natural language input; select, via the LLM, at least one API for performing each activity within the set of ordered activities; generate a data pipeline based on the set of ordered activities and the at least one API for performing each activity; and back-translate the data pipeline to a desired data format for execution by the data integration application.

Example 19 includes the computer-readable storage medium of example 12, including or excluding optional features. In this example, the computer-readable storage medium includes computer-executable instructions that, when executed by the processor, cause the processor to repair the data pipeline to mitigate errors made during at least one of the generation of the set of ordered activities or the selection of the at least one API for performing each activity.

Example 20 includes the computer-readable storage medium of example 12, including or excluding optional features. In this example, the computer-readable storage medium includes computer-executable instructions that, when executed by the processor, cause the processor to generate the set of ordered activities via the LLM by: parsing, via the LLM, the natural language input into multiple activities corresponding to the data integration task represented by the natural language input determining, via the LLM, an execution order for the activities; and determining, via the LLM, dependencies among the activities.

It should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. The logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. The logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of devices. Additionally, in various embodiments, all or some of the various methods and processes may also be embodied in executable hardware modules including, but not limited to, system on chips (SoC's), codecs, specially designed processors and/or logic circuits, and the like, on a device.

As suggested above, each method or process described herein is typically embodied within computer-executable instruction (or code) modules including individual routines, functions, looping structures, selectors, and switches (such as if-then and if-then-else statements), assignments, arithmetic computations, and the like, that, in execution, configure a device to operate in accordance with the particular method or process. However, as suggested above, the exact implementation in executable statement of each of the methods or processes is based on various implementation configurations and decisions, including programming languages, compilers, target processors, operating environments, and the linking or binding operation. The logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

In particular and in regard to the various functions performed by the above described components, devices, circuits, systems and the like, the terms used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for performing natural language-based data integration, wherein the method is implemented via a service provider device comprising a processor, and wherein the method comprises:
    causing execution of a data integration application on a remote device via a network;
    causing surfacing of a graphical user interface (GUI) corresponding to the data integration application on a display of the remote device;
    receiving, via the GUI, a natural language input representing a data integration task;
    generating, via a large language model (LLM), a set of ordered activities corresponding to the data integration task represented by the natural language input;
    selecting, via the LLM, at least one application programming interface (API) for performing each activity within the set of ordered activities;
    generating a data pipeline based on the set of ordered activities and the at least one API for performing each activity; and
    back-translating the data pipeline by converting an intermediate language in which each activity of the set of ordered activities is expressed to a desired data format for execution by the data integration application.

2. The method of claim 1, further comprising:
    executing the at least one API for performing each activity to generate a context for each activity; and
    generating the data pipeline based on the set of ordered activities and the at least one API for performing each activity, in combination with the corresponding context for each activity.

3. The method of claim 2, comprising executing at least a portion of the APIs for performing the activities in parallel.

4. The method of claim 1, further comprising repairing the data pipeline to mitigate errors made during at least one of the generation of the set of ordered activities or the selection of the at least one API for performing each activity.

5. The method of claim 4, wherein repairing the data pipeline comprises mitigating at least one hallucination by the LLM.

6. The method of claim 1, causing surfacing of a representation of the data pipeline via the GUI.

7. The method of claim 6, further comprising:
    receiving, via the GUI, a user input indicating a desire to run or regenerate the data pipeline; and
    running or regenerating the data pipeline in accordance with the user input.

8. The method of claim 1, comprising generating the set of ordered activities via the LLM by:
    parsing, via the LLM, the natural language input into multiple activities corresponding to the data integration task represented by the natural language input;
    determining, via the LLM, an execution order for the activities; and
    determining, via the LLM, dependencies among the activities.

9. The method of claim 8, comprising parsing the natural language input into multiple activities via the LLM based on a specification-based instruction comprising a uniform template for performing task parsing via slot filling, wherein the slots comprise at least one of a task type, a task identification, a task dependency, or a task argument.

10. The method of claim 1, wherein the desired data format comprises a JavaScript Object Notation (JSON) data format.

11. The method of claim 1, wherein the data pipeline comprises an Extract, Transform, and Load (ETL) data pipeline or an Extract, Load, and Transform (ELT) data pipeline.

12. A service provider device, comprising:
    a processor;
    a communication connection for connecting a remote device to the service provider device via a network;
    a data integration application; and
    a computer-readable storage medium operatively coupled to the processor, the computer-readable storage medium comprising computer-executable instructions that, when executed by the processor, cause the processor to:
    cause execution of the data integration application on the remote device via the network;
    cause surfacing of a graphical user interface (GUI) corresponding to the data integration application on a display of the remote device;
    receive, via the GUI, a natural language input representing a data integration task;
    generate, via a large language model (LLM), a set of ordered activities corresponding to the data integration task represented by the natural language input;
    select, via the LLM, at least one application programming interface (API) for performing each activity within the set of ordered activities;
    execute the at least one API for performing each activity to generate a context for each activity;
    generate a data pipeline based on the set of ordered activities, the at least one API for performing each activity, and the corresponding context for each activity;
    back-translate the data pipeline by converting an intermediate language in which each activity of the set of ordered activities is expressed to a desired data format for execution by the data integration application; and cause surfacing of a representation of the data pipeline via the GUI.

13. The service provider device of claim 12, wherein the computer-readable storage medium comprises computer-executable instructions that, when executed by the processor, cause the processor to repair the data pipeline to mitigate errors made during at least one of the generation of the set of ordered activities or the selection of the API for performing each activity.

14. The service provider device of claim 12, wherein the computer-readable storage medium comprises computer-executable instructions that, when executed by the processor, cause the processor to:

receive, via the GUI, a user input indicating a desire to run or regenerate the data pipeline; and run or regenerate the data pipeline in accordance with the user input.

15. The service provider device of claim 12, wherein the computer-readable storage medium comprises computer-executable instructions that, when executed by the processor, cause the processor to generate the set of ordered activities via the LLM by:

parsing, via the LLM, the natural language input into multiple activities corresponding to the data integration task represented by the natural language input;

determining, via the LLM, an execution order for the activities; and determining, via the LLM, dependencies among the activities.

16. The service provider device of claim 15, wherein the computer-readable storage medium comprises computer-executable instructions that, when executed by the processor, cause the processor to parse the natural language input into multiple activities via the LLM based on a specification-based instruction comprising a uniform template for performing task parsing via slot filling, wherein the slots comprise at least one of a task type, a task identification, a task dependency, or a task argument.

17. The service provider device of claim 12, wherein the desired data format comprises a JavaScript Object Notation (JSON) data format.

18. A computer-readable storage medium comprising computer-executable instructions that, when executed by a processor, cause the processor to:

execute a data integration application;

surface a graphical user interface (GUI) corresponding to the data integration application;

receive, via the GUI, a natural language input representing a data integration task;

generate, via a large language model (LLM), a set of ordered activities corresponding to the data integration task represented by the natural language input;

select, via the LLM, at least one application programming interface (API) for performing each activity within the set of ordered activities;

generate a data pipeline based on the set of ordered activities and the at least one API for performing each activity; and back-translate the data pipeline by converting a language in which each activity of the set of ordered activities is expressed to a desired data format for execution by the data integration application.

19. The computer-readable storage medium of claim 18, comprising computer-executable instructions that, when executed by the processor, cause the processor to repair the data pipeline to mitigate errors made during at least one of the generation of the set of ordered activities or the selection of the at least one API for performing each activity.

20. The computer-readable storage medium of claim 18, comprising computer-executable instructions that, when executed by the processor, cause the processor to generate the set of ordered activities via the LLM by:

parsing, via the LLM, the natural language input into multiple activities corresponding to the data integration task represented by the natural language input;

determining, via the LLM, an execution order for the activities; and determining, via the LLM, dependencies among the activities.

* * * * *